(12) United States Patent
Vata

(10) Patent No.: US 12,459,332 B2
(45) Date of Patent: Nov. 4, 2025

(54) CAR AIR CONDITIONING SYSTEM

(71) Applicant: FERRARI S.P.A., Modena (IT)

(72) Inventor: Klajdi Vata, Modena (IT)

(73) Assignee: FERRARI S.P.A., Modena (IT)

( * ) Notice: Subject to any disclaimer, the term of this patent is extended or adjusted under 35 U.S.C. 154(b) by 173 days.

(21) Appl. No.: 18/470,504

(22) Filed: Sep. 20, 2023

(65) Prior Publication Data

US 2024/0092144 A1 Mar. 21, 2024

(30) Foreign Application Priority Data

Sep. 21, 2022 (IT) .................. 102022000019347

(51) Int. Cl.
*B60H 1/00* (2006.01)

(52) U.S. Cl.
CPC ..... *B60H 1/00835* (2013.01); *B60H 1/00671* (2013.01); *B60H 2001/00721* (2013.01)

(58) Field of Classification Search
CPC .......... B60H 1/00678; B60H 2001/002; B60H 2001/00192; B60H 2001/00185; B60H 1/00842; B60H 1/00021; B60H 1/00564; B60H 1/00557
See application file for complete search history.

(56) References Cited

U.S. PATENT DOCUMENTS

| | | | |
|---|---|---|---|
| 5,902,181 A | 5/1999 | Bain | |
| 2003/0066299 A1* | 4/2003 | Aoki | G05D 23/27 236/91 C |
| 2004/0069483 A1* | 4/2004 | Natsume | B60H 1/00678 165/96 |
| 2014/0048227 A1* | 2/2014 | Saitou | B60H 1/00028 165/48.1 |
| 2017/0174040 A1* | 6/2017 | Feltham | B60H 1/00021 |
| 2020/0148030 A1 | 5/2020 | Torok | |
| 2021/0031591 A1* | 2/2021 | Lewczynski | B60H 1/00871 |

FOREIGN PATENT DOCUMENTS

| | | | | |
|---|---|---|---|---|
| DE | 102020119404 A1 | | 2/2021 | |
| EP | 1205321 A2 | * | 5/2002 | ......... B60H 1/00064 |
| FR | 2844483 A1 | | 3/2004 | |
| GB | 2461287 A | * | 12/2009 | ......... B60H 1/00821 |
| JP | 2019167008 A | | 10/2019 | |

OTHER PUBLICATIONS

Italian Search Report for Application No. 102022000019347, Filing Date: Sep. 21, 2022; Date of Mailing: Apr. 21, 2023, 6 pages.

* cited by examiner

*Primary Examiner* — Frantz F Jules
*Assistant Examiner* — Jason N Thompson
(74) *Attorney, Agent, or Firm* — CANTOR COLBURN LLP

(57) ABSTRACT

A car air conditioning system has a pneumatic circuit to feed an air flow into a passenger compartment of a vehicle, and a cooling circuit to cool the air flow fed along the pneumatic circuit; the pneumatic circuit being provided with a three-way joint, which has an inlet connected to a first pneumatic duct, a first outlet connected to a second pneumatic duct, a second outlet communicating with the passenger compartment of the vehicle, and a shutter, which is movable from and to a closing position, wherein the inlet is separate from the two outlets.

12 Claims, 3 Drawing Sheets

CAR AIR CONDITIONING SYSTEM

CROSS-REFERENCE TO RELATED APPLICATIONS

This patent application claims priority from Italian patent application no. 102022000019347 filed on Sep. 21, 2022, the entire disclosure of which is incorporated herein by reference.

TECHNICAL FIELD

The present invention relates to a car air conditioning system.

In particular, the present invention relates to a car air conditioning system of the type comprising a pneumatic circuit for feeding an air flow into a passenger compartment of a vehicle; and a cooling circuit for cooling the air flow fed along the pneumatic circuit.

BACKGROUND

Generally, the pneumatic circuit comprises a fan for generating the air flow; a manifold for feeding the air flow from the fan to the cooling circuit; and two feeding branches connected to the manifold and mounted in parallel to one another for feeding the refrigerated air flow, one into the right area of the vehicle, in particular into the area of the right rear seat, and the other one into the left area of the vehicle, in particular into the area of the left rear seat.

Each feeding branch comprises a first pneumatic duct connected to the manifold, a second pneumatic duct having a free end communicating with the passenger compartment of the vehicle, and a three-way joint interposed between the two pneumatic ducts.

The three-way joint has an inlet connected to the first pneumatic duct, a first outlet connected to the second pneumatic duct, and a second outlet communicating with the passenger compartment of the vehicle.

The three-way joint further comprises a shutter mounted so as to shift between a first opening position, in which the inlet is connected both to the first outlet and to the second outlet, a second opening position, in which the inlet is connected to the first outlet and is separate from the second outlet, and a third opening position, in which the inlet is connected to the second outlet and is separate from the first outlet.

The known car air conditioning systems of the type described above have some drawbacks mainly deriving from the fact that the three-way joint has a relatively reduced versatility and flexibility, is uncapable of selectively controlling the refrigerated air flow rate fed to the two outlets, and entails the deactivation of the fan for simultaneously locking the feeding of refrigerated air to the two outlets.

SUMMARY

The object of the present invention is to provide a car air conditioning system which is exempt from the drawbacks described above and which is simple and cost-effective to manufacture.

According to the present invention, a car air conditioning system is provided as claimed in the appended claims.

BRIEF DESCRIPTION OF THE DRAWINGS

The present invention will now be described with reference to the accompanying drawings, which illustrate a non-limiting example embodiment thereof, wherein.

DESCRIPTION OF EMBODIMENTS

Figure 1:
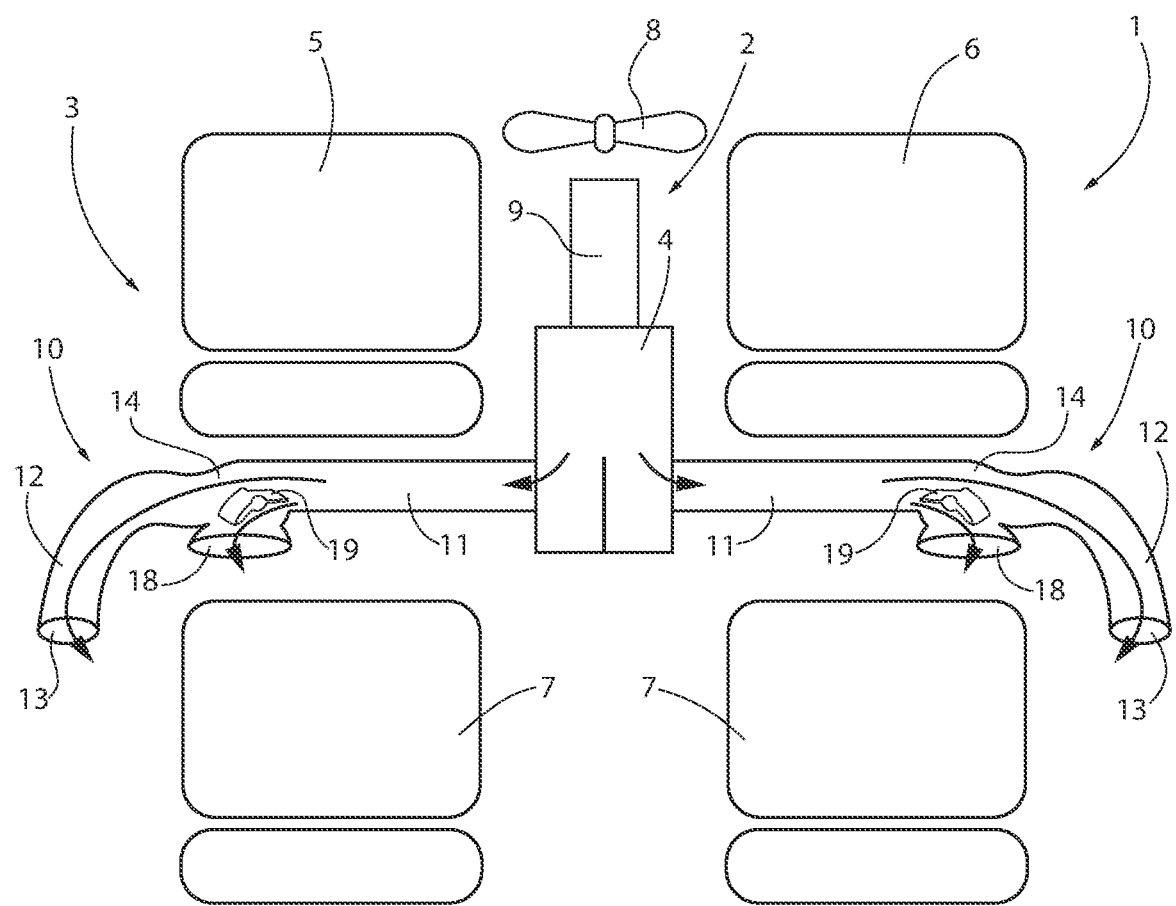
FIG. 1 schematically illustrates, with parts removed for clarity, a preferred embodiment of the car air conditioning system of the present invention.
Figure 2:
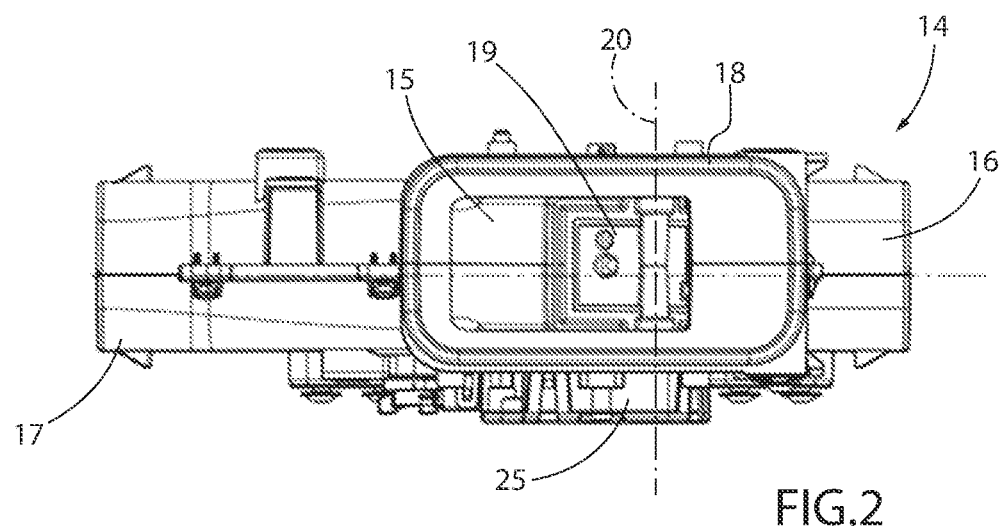
FIG. 2 is a plan schematic view, with parts removed for clarity, of a detail of the car air conditioning system of FIG. 1.

With reference to FIG. 1, reference numeral 1 indicates, as a whole, a car air conditioning system comprising a pneumatic circuit 2 for feeding an air flow into a passenger compartment 3 of a vehicle; and a cooling circuit 4 of known type for cooling the air flow fed along the pneumatic circuit 2.

The passenger compartment 3 has a left front seat 5 for the driver, a right front seat 6 for a passenger, and two rear seats 7 for further passengers.

The pneumatic circuit 2 comprises a fan 8, a manifold 9 for feeding the air flow generated by the fan 8 to the cooling circuit 4, and two feeding branches 10 connected to the manifold 9 and mounted in parallel to one another for feeding the refrigerated air flow into the area of the two rear seats 7.

Each branch 10 comprises a first pneumatic duct 11 connected to the manifold 9, a second pneumatic duct 12 having a free end 13 communicating with the passenger compartment 3 at the upper area of a relative seat 7, and a three-way joint 14 interposed between the two ducts 11, 12.

The three-way joint 14 comprises a valve body 15 with a cylindrical shape provided with an inlet 16 connected to the duct 11, with a first outlet 17 connected to the duct 12, and with a second outlet 18 communicating with the passenger compartment 3 at the lower area of a relative seat 7.

With regard to what described above, it is suitable to specify that the inlet 16 has a longitudinal axis 16a, which is parallel to, in particular coinciding with, a longitudinal axis 17a of the outlet 17, and is transverse, in particular perpendicular, to a longitudinal axis 18a of the outlet 18.

The three-way joint 14 further comprises a shutter 19 mounted within the valve body 15 for rotating around an axis of rotation coinciding with a longitudinal axis 20 of the valve body 15.

The shutter 19 comprises a rocker arm 21 provided with two arms 22a, 22b, which are arranged at an angle smaller than 180° relative to one another, and are each delimited by a respective end edge 23, which is parallel to the axis 20 and cooperating with an inner surface 24 of the valve body 15.

Figure 3:
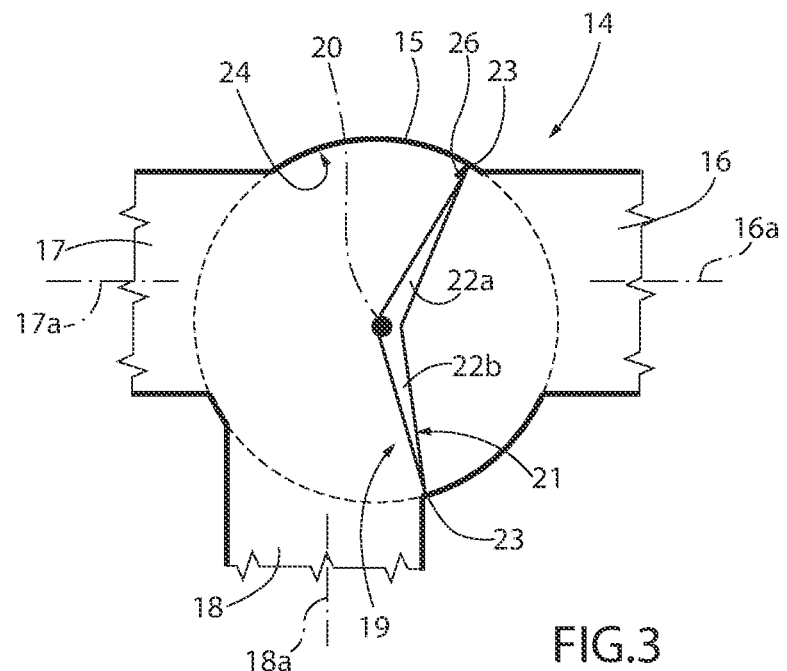
FIGS. 3-6 schematically illustrate the detail of FIG. 2 in four different operating conditions.
Figure 4:
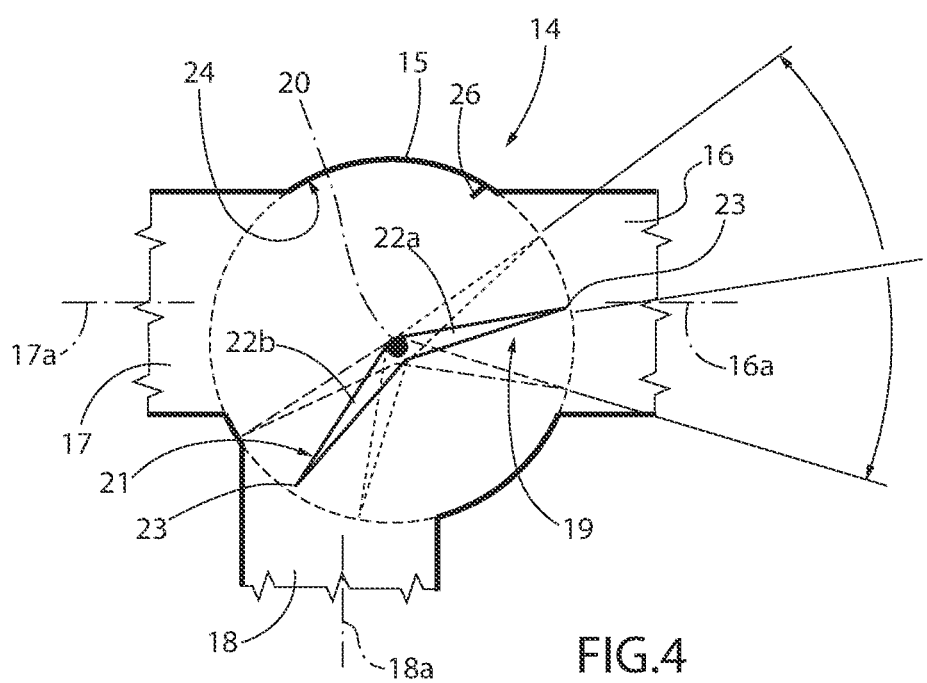
Figure 5:
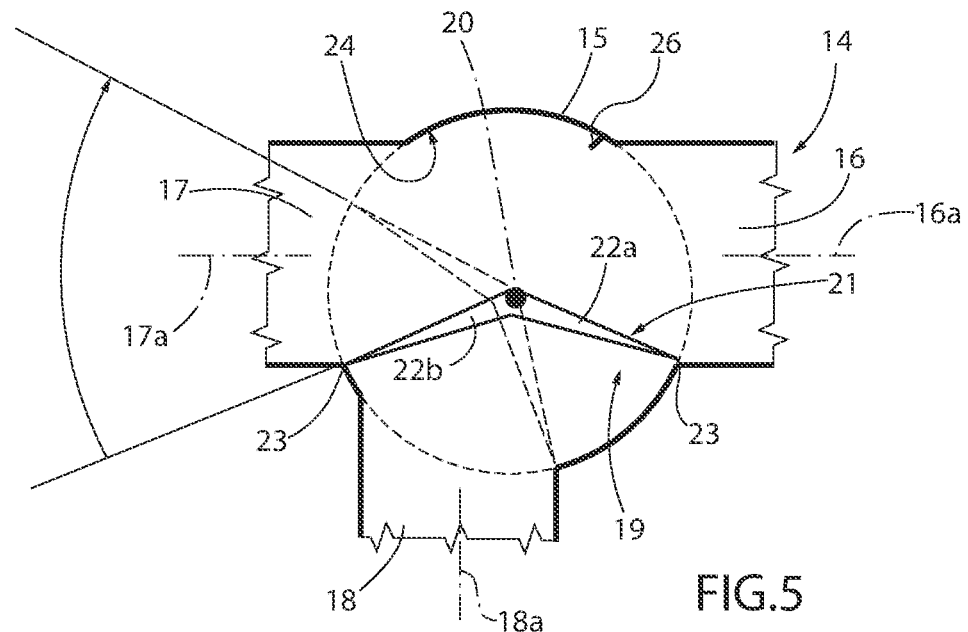

The three-way joint 14 further comprises an actuation device 25 for shifting the shutter 19 around the axis 20 between a closing position (FIG. 3), in which the inlet 16 is separate from the two outlets 17, 18, at least one first opening position (FIG. 4), in which the inlet 16 is connected both to the outlet 17 and to the outlet 18, a second opening position (illustrated by a solid line in FIG. 5), in which the inlet 16 is connected to the outlet 17 and is separate from the outlet 18, and a third opening position (illustrated by a solid line in FIG. 6), in which the inlet 16 is connected to the outlet 18 and is separate from the outlet 17.

Figure 6:
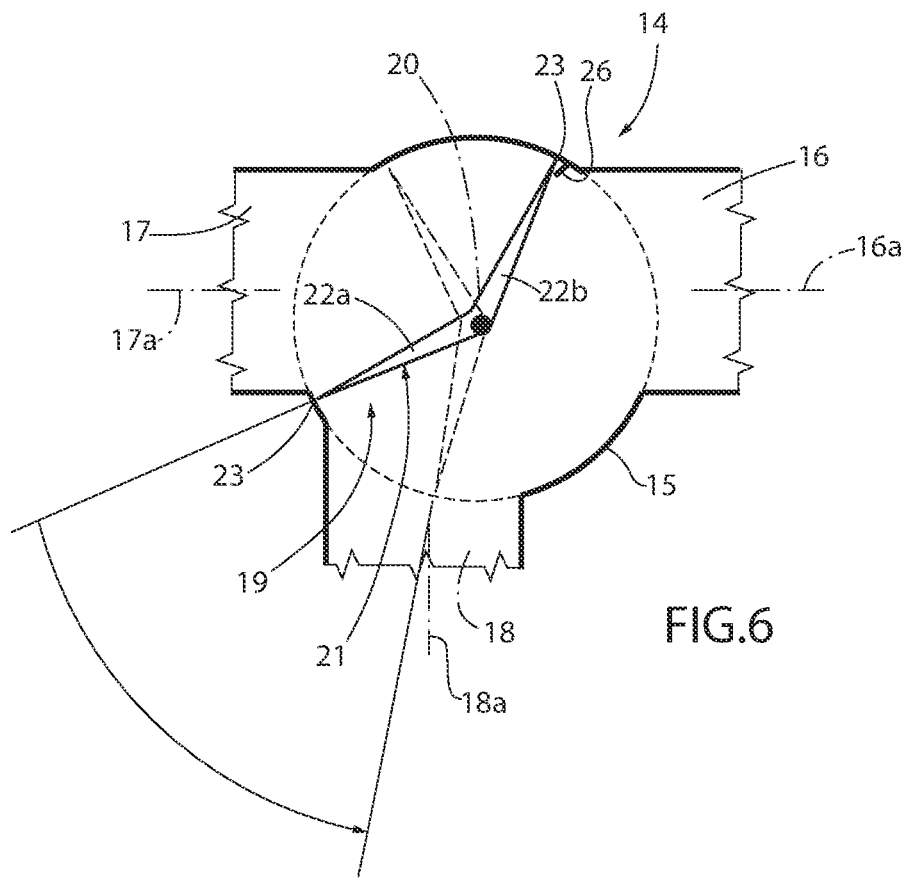

The three-way joint 14 is further provided with a limit stop element 26, which protrudes within the valve body 15 from the surface 24 for stopping the shutter 19 in the closing position (FIG. 3) and in the third opening position (FIG. 6).

The inlet 16, the outlets 17, 18, and the shutter 19 are arranged and configured to allow the shutter 19 to shift:

to a plurality of first opening positions (illustrated by a solid line and by a dashed line in FIG. 4), in which the shutter 19 selectively controls the refrigerated air flow rate fed to the outlet 17 and to the outlet 18;

to a plurality of fourth opening positions (one of which is illustrated by a dashed line in FIG. 5), in which the arm 22a prevents the refrigerated air flow fed through the inlet 16 from reaching the outlet 18, the arm 22b directs the refrigerated air flow fed through the inlet 16 towards the outlet 17, and the shutter 19 selectively controls the refrigerated air flow rate fed to the outlet 17; and to a plurality of fifth opening positions (of which one is illustrated by a dashed line in FIG. 6), in which the arm 22b prevents the refrigerated air flow fed through the inlet 16 from reaching the outlet 17, the arm 22a directs the refrigerated air flow fed through the inlet 16 towards the outlet 18, and the shutter 19 selectively controls the refrigerated air flow rate fed to the outlet 18.

The car air conditioning system 1 has some advantages mainly deriving from the fact that the inlet 16, the outlets 17, 18, and the shutter 19 are arranged and configured to allow the three-way joint 14 to selectively control the refrigerated air flow rate fed to the two outlets 17, 18 when the shutter 19 is arranged in one of the opening positions and to prevent the feeding of refrigerated air to the two outlets 17, 18 when the shutter 19 is arranged in the closing position.

The invention claimed is:

1. A car air conditioning system comprising a pneumatic circuit (2) configured to feed an air flow into a passenger compartment (3) of a vehicle; and a cooling circuit (4) to cool the air flow fed along the pneumatic circuit (2); the pneumatic circuit (2) comprising at least one feeding branch (10) comprising, in turn, a first pneumatic duct (11), a second pneumatic duct (12) and a three-way joint (14), wherein the pneumatic circuit (2) further includes an inlet (16) connected to the first pneumatic duct (11), a first outlet (17) connected to the second pneumatic duct (12), a second outlet (18) configured to communicate with the passenger compartment (3) of the vehicle, and a shutter (19), which is movable within the three-way joint (14) from and to a closing position for the inlet (16), wherein the inlet (16) is separate from the two outlets (17, 18), wherein the three-way joint (14) comprises a valve body (15) with a cylindrical shape provided with the inlet (16) and with the two outlets (17, 18); the shutter (19) being mounted within the valve body (15) so as to rotate around a longitudinal axis (20) of the valve body (15), wherein the shutter (19) comprises a rocker arm (21) provided with a first arm (22a) and with a second arm (22b), each delimited by a respective end edge (23), which is parallel to the longitudinal axis (20) of the valve body (15) and cooperates with an inner surface (24) of the valve body (15), and wherein the shutter (19) is movable to a plurality of fourth opening positions, in which the first arm (22a) prevents the refrigerated air flow fed through the inlet (16) from reaching the second outlet (18), the second arm (22b) directs the refrigerated air flow fed through the inlet (16) towards the first outlet (17) and the shutter (19) selectively controls the refrigerated air flow rate fed through the first outlet (17).

2. The car air conditioning system according to claim 1, wherein the shutter (19) is movable to at least one first opening position, in which the inlet (16) is connected both to the first outlet (17) and to the second outlet (18).

3. The car air conditioning system according to claim 2, wherein the shutter (19) is movable to a plurality of first opening positions, in which the inlet (16) is connected both to the first outlet (17) and to the second outlet (18), so as to selectively control the refrigerated air flow rate fed to the two outlets (17, 18).

4. The car air conditioning system according to claim 1, wherein the shutter (19) is movable to a second opening position, in which the inlet (16) is fluidly connected to the first outlet (17) and is closed from the second outlet (18).

5. The car air conditioning system according to claim 1, wherein the shutter (19) is movable to a third opening position, in which the inlet (16) is fluidly connected to the second outlet (18) and is closed from the first outlet (17).

6. The car air conditioning system according to claim 5, wherein the three-way joint (14) further comprises a limit stop element (26) to stop the shutter (19) in the closing position and in the third opening position.

7. The car air conditioning system according to claim 1, wherein the shutter (19) is delimited by at least one end edge (23) parallel to the longitudinal axis (20) of the valve body (15) and cooperating with an inner surface (24) of the valve body (15).

8. The car air conditioning system according to claim 7, wherein the inlet (16) has a longitudinal axis (16a) parallel to a longitudinal axis (17a) of the first outlet (17) and transverse to a longitudinal axis (18a) of the second outlet (18).

9. The car air conditioning system according to claim 1, wherein the two arms (22a, 22b) are arranged at an angle smaller than 180° relative to one another.

10. The car air conditioning system according to claim 1, wherein the shutter (19) is movable to a plurality of fifth opening positions, in which the second arm (22b) prevents the refrigerated air flow fed through the inlet (16) from reaching the first outlet (17), the first arm (22a) directs the refrigerated air flow fed through the inlet (16) towards the second outlet (18) and the shutter (19) selectively controls the refrigerated air flow rate fed through the second outlet (18).

11. The car air conditioning system according to claim 1, wherein the at least one feeding branch (10) comprises two feeding branches (10), and wherein the pneumatic circuit (2) comprises a manifold (9) to feed the air flow to the cooling circuit (4) and the two feeding branches (10) connected to the manifold (9) and mounted in parallel to one another to feed the refrigerated air flow to different areas of the passenger compartment (3).

12. A vehicle comprising a passenger compartment (3); and a car air conditioning system according to claim 1.

* * * * *